(12) United States Patent
Kawada et al.

(10) Patent No.: US 7,402,970 B2
(45) Date of Patent: Jul. 22, 2008

(54) ELECTRIC POWER STEERING DEVICE

(75) Inventors: Hideaki Kawada, Gunma (JP); Yuho Aoki, Gunma (JP)

(73) Assignee: NSK Ltd., Tokyo (JP)

( * ) Notice: Subject to any disclaimer, the term of this patent is extended or adjusted under 35 U.S.C. 154(b) by 184 days.

(21) Appl. No.: 11/508,302

(22) Filed: Aug. 23, 2006

(65) Prior Publication Data
US 2007/0205733 A1    Sep. 6, 2007

(30) Foreign Application Priority Data
Aug. 23, 2005    (JP)    ............ P. 2005-241545

(51) Int. Cl.
*H02P 7/00*    (2006.01)

(52) U.S. Cl. .............. 318/432; 318/434; 318/433; 323/274; 323/284; 180/446; 701/41; 701/42

(58) Field of Classification Search ........... 318/432, 318/434, 433; 323/274, 284; 180/446; 701/41, 701/42
See application file for complete search history.

(56) References Cited

U.S. PATENT DOCUMENTS 5,740,040 A * 4/1998 Kifuku et al. ............... 701/41
6,502,024 B2 * 12/2002 Ishihara et al. ............. 701/41
6,727,669 B2 * 4/2004 Suzuki et al. ............. 318/139

FOREIGN PATENT DOCUMENTS

JP    8-337172 A    12/1996

* cited by examiner

*Primary Examiner*—Rita Leykin
(74) *Attorney, Agent, or Firm*—Sughrue Mion, PLLC

(57) ABSTRACT

The present invention includes a control part for controlling switching elements on diagonal lines in the upper and lower stage of an H bridge circuit respectively by different duty ratios based on a steering torque exerted on a steering system, and an electric power supply source for supplying an electric power. When the voltage of the electric power supply source is lower than a prescribed voltage, the control part causes the switching element EET 1 or FET2 on the upper-stage side to be driven by a pulse width modulation signal PWM1 or PWM2, the switching element FET 4 or FET3 on the lower-stage side to be turned on, and the frequency of the pulse width modulation signal to be lowered to an audible frequency range.

2 Claims, 9 Drawing Sheets

ELECTRIC POWER STEERING DEVICE

This application claims priority under 35 USC 119 from Japanese Patent Application No. 2005-241545, the disclosure of which is herein incorporated by reference.

BACKGROUND OF THE INVENTION

1. Technical Field

The present invention relates to an electric power steering device having an electric motor for giving to a steering system, an auxiliary steering force based on steering torque acting on the steering system.

2. Related Art

As the electric power steering device of this type, a device has been known that includes a driving circuit having a power source connected between input terminals of a bridge circuit. The bridge circuit is formed by connecting, for instance, four semiconductor elements in an H bridge form. A motor driving circuit having a motor for giving an auxiliary steering force to a steering mechanism is connected between output terminals. A driving control unit drives the semiconductor elements of two pairs of semiconductors, each pair including two semiconductors and the two pairs opposing the two arms of the H bridge circuit. The semiconductor elements of the first arm are driven by a PWM signal of a first duty ratio determined on the basis of an auxiliary steering command value calculated in accordance with a steering torque and a current control value calculated from a detected motor current value. The semiconductor elements of the second arm are driven by a PWM signal of a second duty ratio defined by the function of the first duty ratio (for instance, see Japanese Patent Unexamined Publication JP-A-8-337172 (page 2, FIG. 3 and FIG. 5)).

However, in a usual example described in the JP-A-8-337172, a battery is employed as the power source of the motor driving circuit. Thus when the voltage of the battery falls, an adequate voltage between the terminals of the motor cannot be ensured. Therefore the auxiliary steering force generated in the motor is lowered or the motor is stopped to stop the auxiliary steering force. Thus, a steering operation of a steering wheel is heavy. Especially, in the electric power steering device of a high output, when a wheel turning operation is carried out under a stopping state, an unsolved problem arises that the steering wheel is hardly driven.

Further, when a steering operation is carried out by using a battery whose deterioration is advanced, the internal resistance of the battery increases. As a motor current is increased, the voltage of the battery is markedly lowered. As a result, an unsolved problem arises that voltage between the terminals of the motor cannot be sufficiently ensured and the auxiliary steering force is lowered or a steering assistance is stopped, so that the steering operation of the steering wheel is heavy.

SUMMARY OF THE INVENTION

Thus, the present invention takes the above-described unsolved problems of the usual example into consideration. It is an object of the present invention to provide an electric power steering device in which when a battery voltage decreases, a slight voltage to be applied to an electric motor is ensured, so that a state wherein a steering operation of a steering wheel is heavy can be avoided and a steering assistance can be continuously performed.

In order to achieve the above-described object, according to a first aspect of the invention, there is provided an electric power steering device comprising: two series circuits, comprising switching elements of an upper stage and a lower stage, respectively; an H bridge circuit comprising the two series circuits which are connected in parallel with each other; an electric motor for giving an auxiliary steering force to a steering system; a control part for controlling the switching elements on a diagonal line in the upper stage and a diagonal line in the lower stage of the H bridge circuit to be respectively pulse-width modulated by a plurality of differing duty ratios in accordance with a steering torque exerted on the steering system; and an electric power supply source for supplying an electric power to the H bridge circuit; wherein the electric motor is provided between intermediate portions of the two series circuits, the intermediate portions being located between the switching element of the upper stage and the switching element of the lower stage, wherein at a normal state that the voltage of the electric power supply source is at least a prescribed voltage, the control part controls the switching elements on the diagonal lines to be pulse-width modulated by the different duty ratios with a frequency exceeding an audible range, and wherein at an abnormal time when the voltage of the electric power supply source is less than the prescribed voltage, the control part controls the switching elements in the upper stage of the switching elements on the diagonal lines to be pulse-width modulated with a frequency within the audible range, and the switching elements in the lower stage are controlled to be turned on.

According to another aspect of the invention, the electric power steering device further comprising: a vehicle speed detecting unit for detecting a vehicle speed, wherein when the voltage of the electric power supply source is less than the prescribed voltage and the vehicle speed detected by the vehicle speed detecting unit is at least a prescribed vehicle speed, the control part controls the switching elements in the upper stage on the diagonal lines to be pulse-width modulated with the frequency within the audible range, and the switching elements in the lower stage are controlled to be turned on.

According to the present invention, when the voltage of the battery is decreased, the switching elements in the lower stage side of the switching elements on the diagonal lines of the H bridge circuit are controlled to be turned on instead of being controlled by pulse-width modulation. Thus, the switching loss of the switching elements in the lower stage can be eliminated. In addition, the frequency of a pulse width modulating signal supplied to the switching elements in the upper stage is lowered from the frequency exceeding the audible range to the frequency within the audible frequency, so that the switching loss of the switching elements in the upper stage can be lowered. Accordingly, the voltage decrease of the battery can be suppressed, voltage between the terminals of the motor can be ensured, and a range of the voltage of the battery wherein an auxiliary steering operation can be continuously controlled is enlarged.

Figure 1:
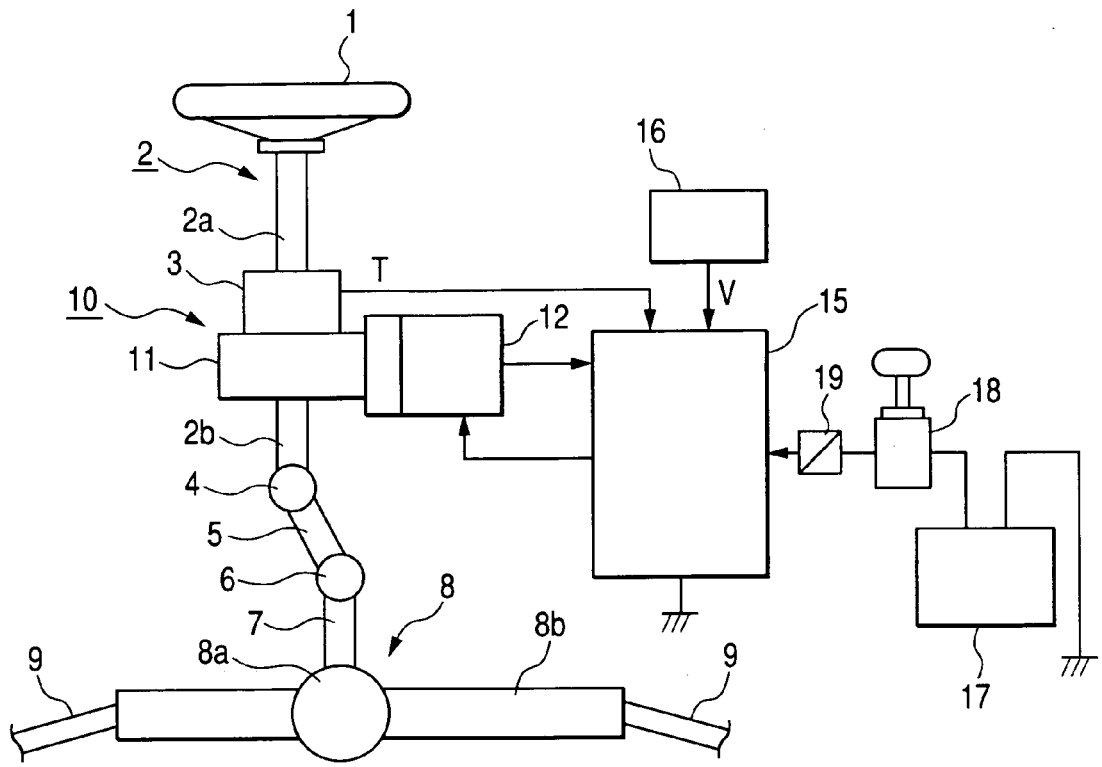
FIG. 1 is a schematic block diagram showing one embodiment of the present invention.

Now, an embodiment of the present invention will be described below by referring to the drawings.

FIG. 1 is an entire block diagram showing one embodiment of the present invention. In the drawing, reference numeral 1 designates a steering wheel. A steering force exerted on the steering wheel 1 by a driver is transmitted to a steering shaft 2 having an input shaft 2a and an output shaft 2b. In the steering shaft 2, one end of the input shaft 2a is connected to the steering wheel 1 and the other end is connected to one end of the output shaft 2b through a steering torque sensor 3 that detects a steering torque.

Then, the steering force transmitted to the output shaft 2b is transmitted to a lower shaft 5 through a universal joint 4, and further transmitted to a pinion shaft 7 through a universal joint 6. The steering force transmitted to the pinion shaft 7 is transmitted to a tie rod 9 through a steering gear 8 to roll and steer a rolling and steering wheel not shown in the drawing. Here, the steering gear 8 is formed in a rack and pinion form having a pinion 8a connected to the pinion shaft 7 and a rack 8b engaging with the pinion 8a to convert a rotating movement transmitted to the pinion 8a to a linear movement by the rack 8b.

An auxiliary steering mechanism 10 for transmitting an auxiliary steering force to the output shaft 2b is connected to the output shaft 2b of the steering shaft 2. The auxiliary steering mechanism 10 includes a speed reducing gear 11 connected to the output shaft 2b and an electric motor 12 composed of, for instance, a dc motor connected to the speed reducing gear 11 for generating the auxiliary steering force.

Figure 2:
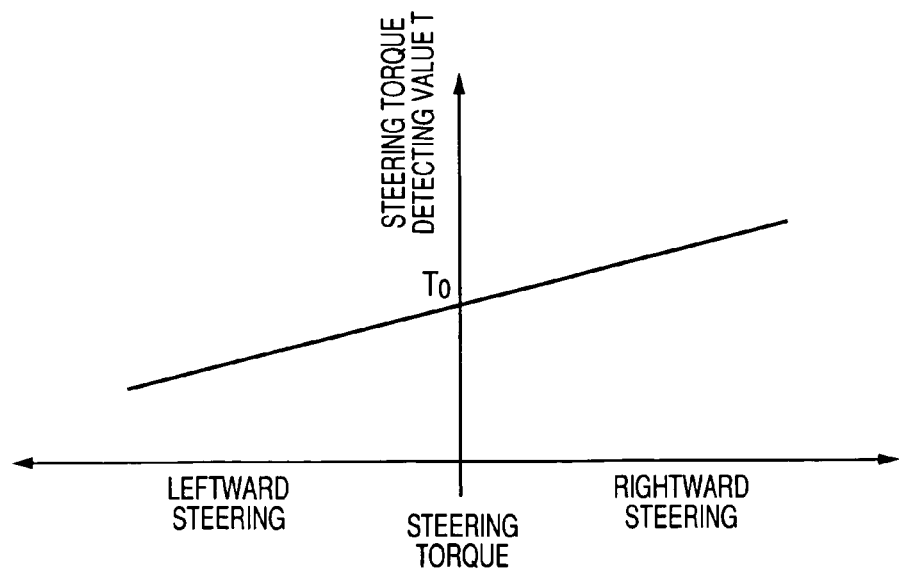
FIG. 2 is a characteristic line chart of a steering torque detecting signal outputted from a steering torque sensor.

The steering torque sensor 3 serves to detect a steering torque exerted on the steering wheel 1 that is transmitted to the input shaft 2a. For instance, the steering torque sensor 3 is designed to convert the steering torque to a twist angle rotation of a torsion bar (not shown in the drawing) interposed between the input shaft 2a and the output shaft 2b and to detect the twist angle rotation by a potentiometer. As shown in FIG. 2, the steering torque sensor 3 is formed to output steering torque detecting values T described below. When the inputted steering torque is zero, the steering torque sensor 3 outputs the steering torque detecting value of a prescribed neutral torque To. Under this state, when the steering wheel is swung rightward, the steering torque sensor 3 outputs the steering torque detecting value increasing from the neutral torque To as the steering torque increases. When the steering wheel is swung leftward from a state that the steering torque is zero, the steering torque sensor 3 outputs the steering torque detecting value decreasing from the neutral torque To as the steering torque increases.

Figure 3:
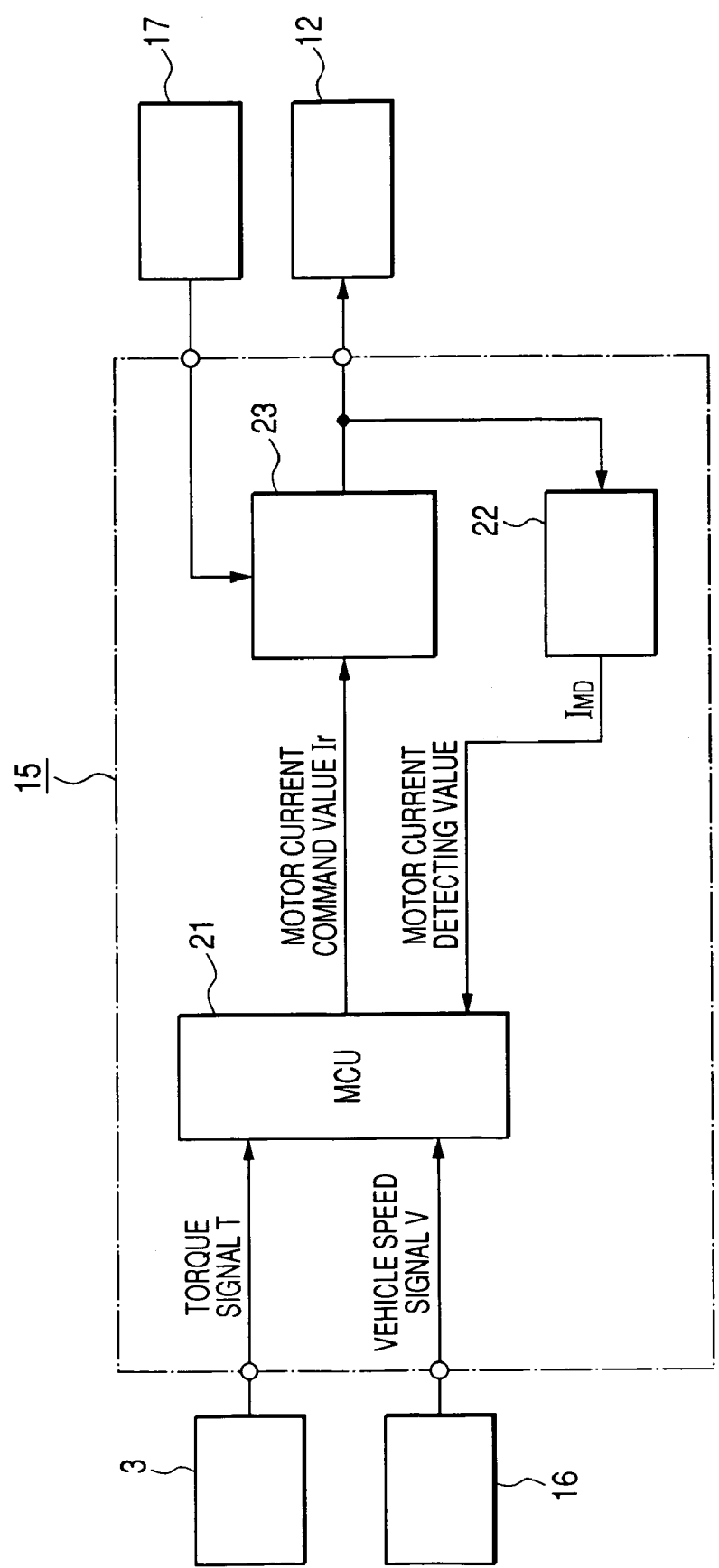
FIG. 3 is a block diagram showing a specific structure of the controller shown in FIG. 1.

The steering torque detecting value T outputted from the steering torque sensor 3 is inputted to a driving controller 15 for controlling the electric motor 12. As shown in FIG. 3, a vehicle speed detecting value V detected by a vehicle speed sensor 16 is inputted to the controller 15 as well as the steering torque detecting value T.

Figure 4:
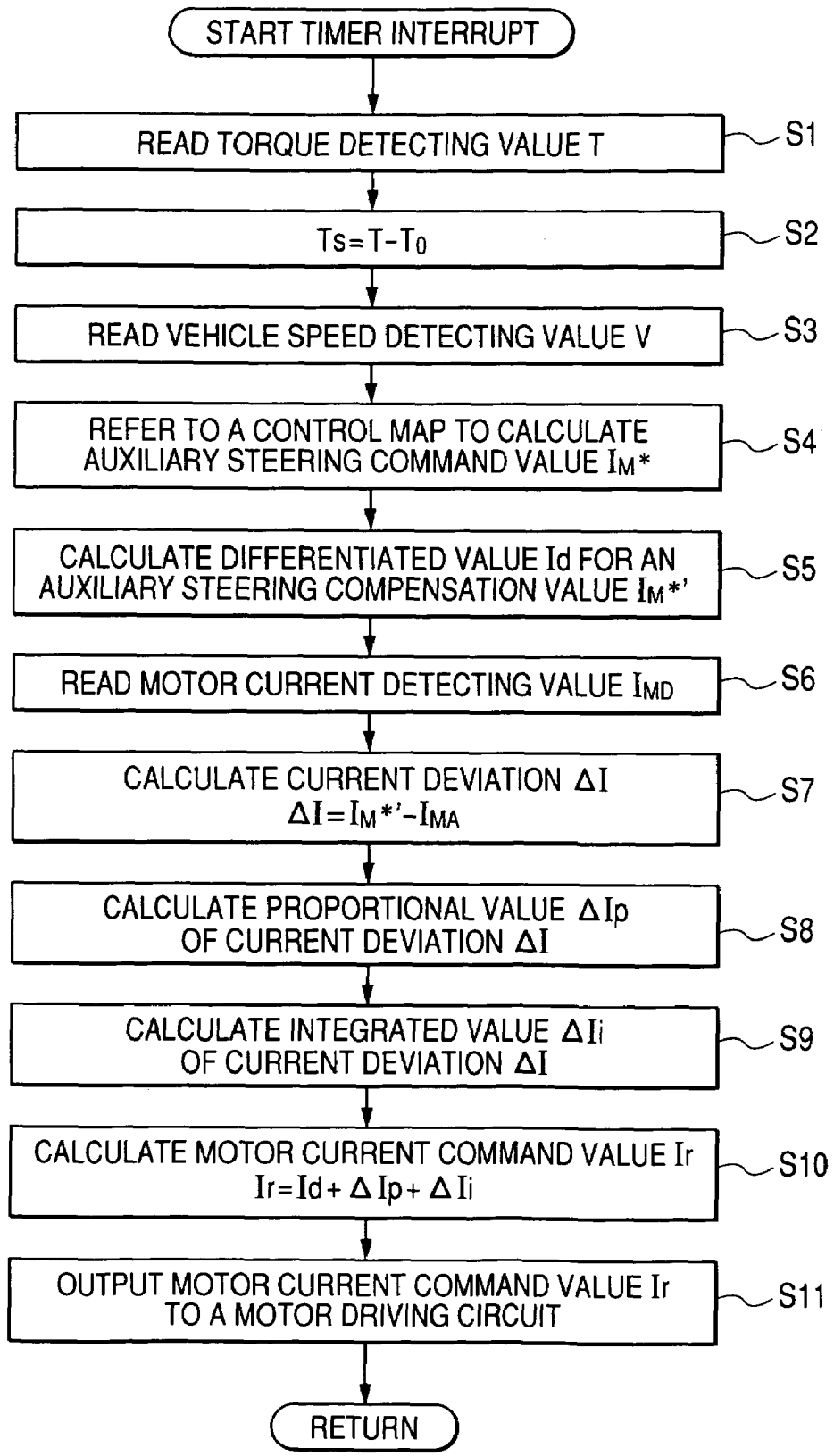
FIG. 4 is a flowchart showing one example of the procedure of auxiliary steering control process performed by the MCU in the controller.

Then, the controller 15 includes an MCU (Micro Controller Unit) 21 to which the steering torque detecting value T and the vehicle speed detecting value V are inputted together with a motor current detecting value $I_{MD}$ inputted from a motor current detecting circuit 22 so as to perform an auxiliary steering control process shown in FIG. 4 on the basis of these values and the MCU outputs a motor current command value Ir. The controller 15 also includes a motor driving circuit 23 to which the motor current command value Ir outputted from the MCU 21 is inputted, and the electric motor 12 is controlled to be turned on in accordance with these values.

Here, the MCU 21 calculates an auxiliary steering command value $I_M^*$ for generating the auxiliary steering force in the electric motor 12 in accordance with the inputted steering torque detecting value T and the vehicle speed detecting value V. The auxiliary steering control process shown in FIG. 4 for calculating the motor current command value Ir performs feedback control of a driving current supplied to the electric motor 12 based on the auxiliary steering command value $I_M^*$ and the motor current detecting value $I_{MD}$.

The auxiliary steering control process is performed as a timer interrupt process at intervals of prescribed time (for instance, 1 msec), as shown in FIG. 4. Firstly, in step S1, the steering torque detecting value T detected in the steering torque sensor 3 is read. Then, the procedure moves to step S2 to subtract the neutral torque To from the steering torque detecting value T. Thus, the steering torque Ts (=T−To) is calculated.

Then, the procedure moves to step S3 to read the vehicle speed detecting value V detected in the vehicle speed sensor 16. After that, the procedure moves to step S4 and the auxiliary steering command value $I_M^*$ is calculated as a current command value by referring to an auxiliary steering command value calculating map shown in FIG. 5 based on the steering torque Ts and the vehicle speed detecting value V.

Figure 5:
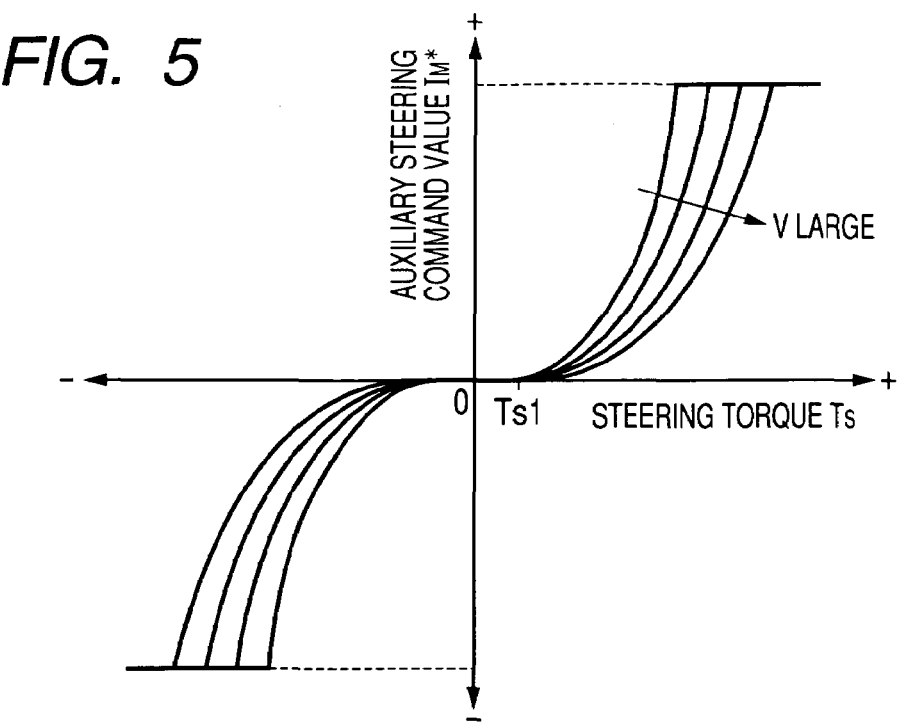
FIG. 5 is an explanatory view showing an auxiliary steering command value calculating map that illustrates the relationship between a steering torque that undergoes an auxiliary steering control process and an auxiliary steering command value.

As shown in FIG. 5, the auxiliary steering command value calculating map is formed by a characteristic line chart shown by a parabolic curve wherein the vehicle speed detecting value V is a parameter and the steering torque Ts is a horizontal axis and the auxiliary steering command value $I_M^*$ is a vertical axis. While the steering torque Ts ranges from "0" to a setting value Ts1 near "0", the auxiliary steering command value $I_M^*$ maintains "0". When the steering torque Ts exceeds the setting value Ts1, the auxiliary steering command value $I_M^*$ is set to gently increase initially relative to the increase of the steering torque Ts. However, when the steering torque Ts further increases, the auxiliary steering command value $I_M^*$ is set to increase steeply relative to the increase in steering torque Ts and the characteristic curve is set so that an inclination becomes smaller as a vehicle speed is increased.

Then, the procedure moves to step S5 to differentiate the auxiliary steering command value $I_M^*$ and calculate a differential value Id for a feed-forward control. Then, the procedure moves to step S6 to read the motor current detecting value $I_{MD}$. After that, the procedure advances to step S7 to subtract the motor current detecting value $I_{MD}$ from the auxiliary steering command value $I_M^*$ to calculate a current deviation ΔI. After that, the procedure advances to step S8 to proportionally calculate the current deviation ΔI and calculate a proportional value ΔIp for controlling a proportional compensation.

Then, the procedure moves to step S9 to integrate the current deviation ΔI and calculate an integrated value ΔIi for controlling an integrated compensation. Then, the procedure moves to step S10 to sum the differentiated value Id, the proportional value ΔIp, and the integrated value Δii, and the motor current command value Ir (=Id+ΔIp+ΔIi) is calculated, and then the procedure moves to step S11.

In the step S11, after the motor current command value Ir is outputted to the motor driving circuit 23, the timer interrupt process is completed, and the process returns to a prescribed main program.

Figure 6:
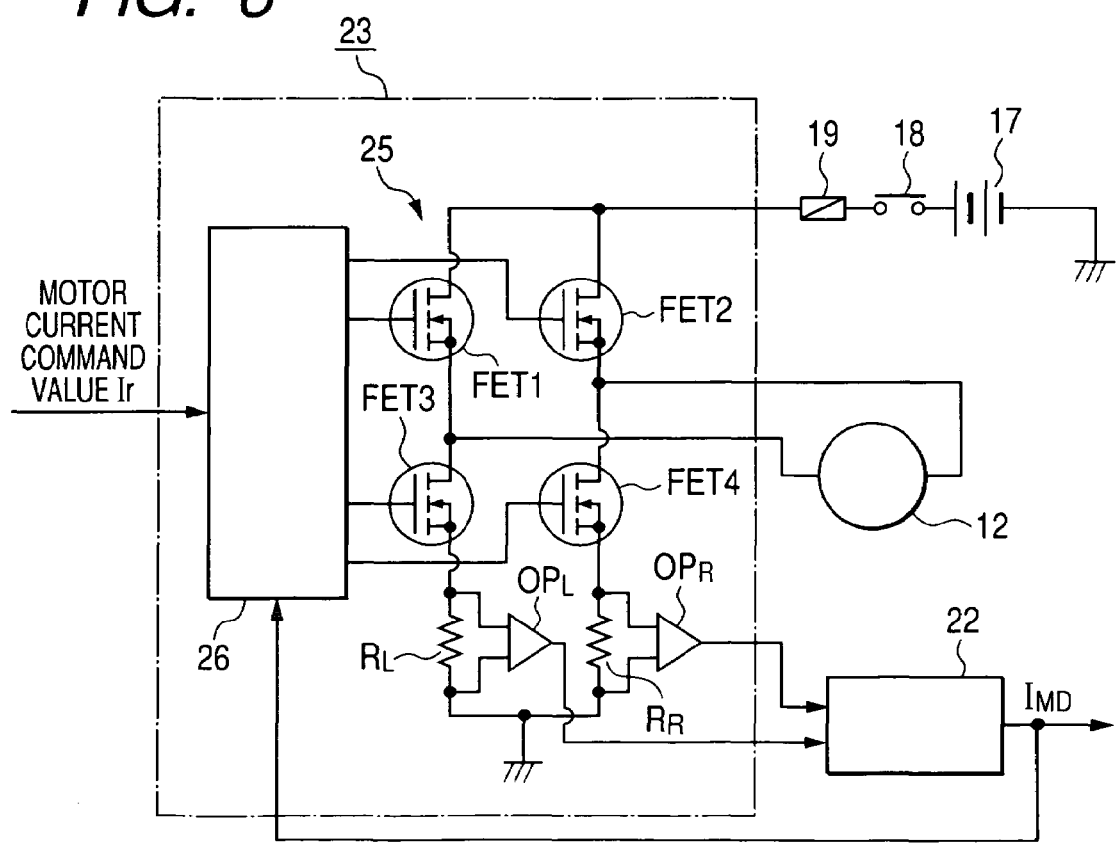
FIG. 6 is a block diagram showing a specific structure of a motor driving circuit in the controller.

Further, as shown in FIG. 6, the motor driving circuit 23 includes an H bridge circuit 25 composed of four field effect transistors FET1 to FET4 for controlling a driving current supplied to the electric motor 12, and an FET gate driving circuit 26 having a calculation processing function as a control part for respectively opening and closing the gates of the field effect transistors FET1 to FET4 forming the H bridge circuit 25 in accordance with the motor current command value Ir inputted form the MCU 21.

The H bridge circuit 25 includes the field effect transistors FET1 and FET2 forming an upper-stage arm connected in parallel with a battery 17 that functions as a power supply part through an ignition switch 18 and a fuse 19, the field effect transistors FET3 and FET4 connected in series to the field effect transistors EET1 and FET2, and shunt resistances $R_L$ and $R_R$ interposed between the field effect transistors FET3 and FET4 and an earth ground. The electric motor 12 is connected between a node of the field effect transistors FET1 and FET3 forming a series circuit and between a node of the field effect transistors FET2 and FET4 that similarly form a series circuit.

Further, the decrease in voltage at both ends of the shunt resistances $R_L$ and $R_R$ is detected as a motor current by operational amplifiers $OP_L$ and $OP_R$. The motor current detected by the operational amplifiers $OP_L$ and $OP_R$ is supplied to the motor current detecting circuit 22 to output positive and negative motor current detecting values $I_{MD}$ to the MCU 21.

Figure 7:
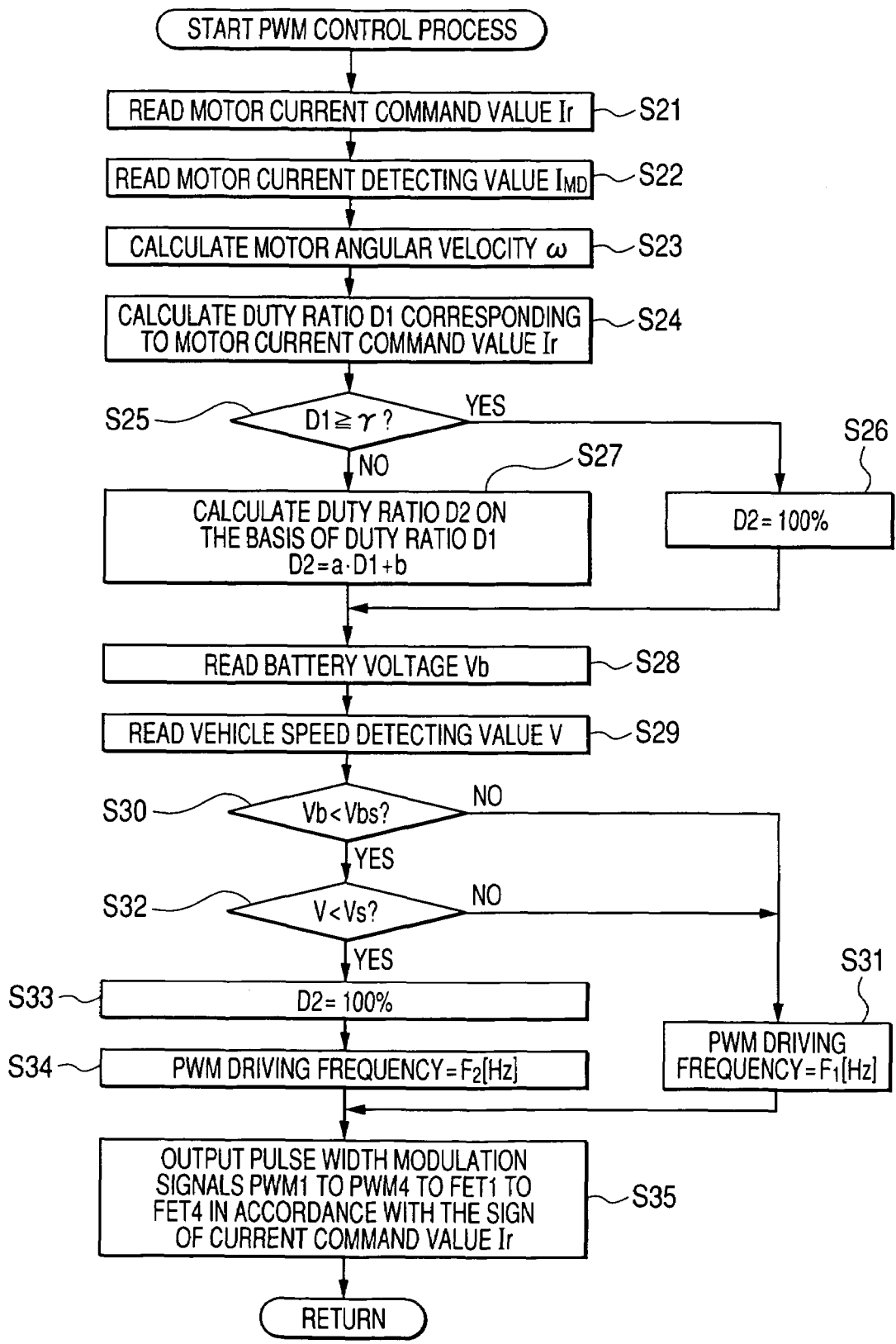
FIG. 7 is a flowchart showing one example of the procedure of pulse width modulation control process performed in the FET gate driving circuit.

Here, in the FET gate driving circuit 26, a pulse width modulation (PWM) control process shown in FIG. 7 is performed in accordance with the motor current command value Ir to output pulse width modulation signals PWM1 to PWM4 that are respectively supplied to the gates of the field effect transistors FET1 to FET4 of the H bridge circuit 25.

In the pulse width modulation control process, as shown in FIG. 7, firstly in step S21, the motor current command value Ir inputted from the MCU 21 is read. Then, the procedure moves to step S22 to read the motor current detecting value $I_{MD}$. Then, the procedure moves to step S23 to calculate a motor angular velocity ω in accordance with a below-described formula (1).

$$\omega = \{V_M - (Ls+R)I_{MD}\}/K_T \quad (1)$$

Here, L designates an inductance of the electric motor 12. R designates a resistance between terminals of the motor, s designates a Laplace operator. $K_T$ designates a constant counter electromotive force of a motor. $V_M$ designates a voltage between terminals of the motor, and is calculated in accordance with a below-described formula (2).

$$V_M = D1 \cdot Vb + (1-D2)(-Vb) = (D1+D2-1)Vb \quad (2)$$

Here, D1 designates a duty ratio of the pulse width modulation signals supplied to the gates of the field effect transistors FET1 and FET2 of the upper-stage arm of the H bridge circuit 25. D2 designates the duty ratio of the pulse width modulation signals supplied to the gates of the field effect transistors FET3 and FET4 of the lower-stage arm of the H bridge circuit 25. Vb designates a battery voltage.

Then, the procedure advances to step S24 to determine the duty ratio D1 of the pulse width modulation signals for driving the field effect transistors FET1 and FET2 of the upper-stage arm of the H bridge circuit 25 in accordance with the absolute value |Ir| of the motor current command value Ir read in the step S21.

Figure 8:
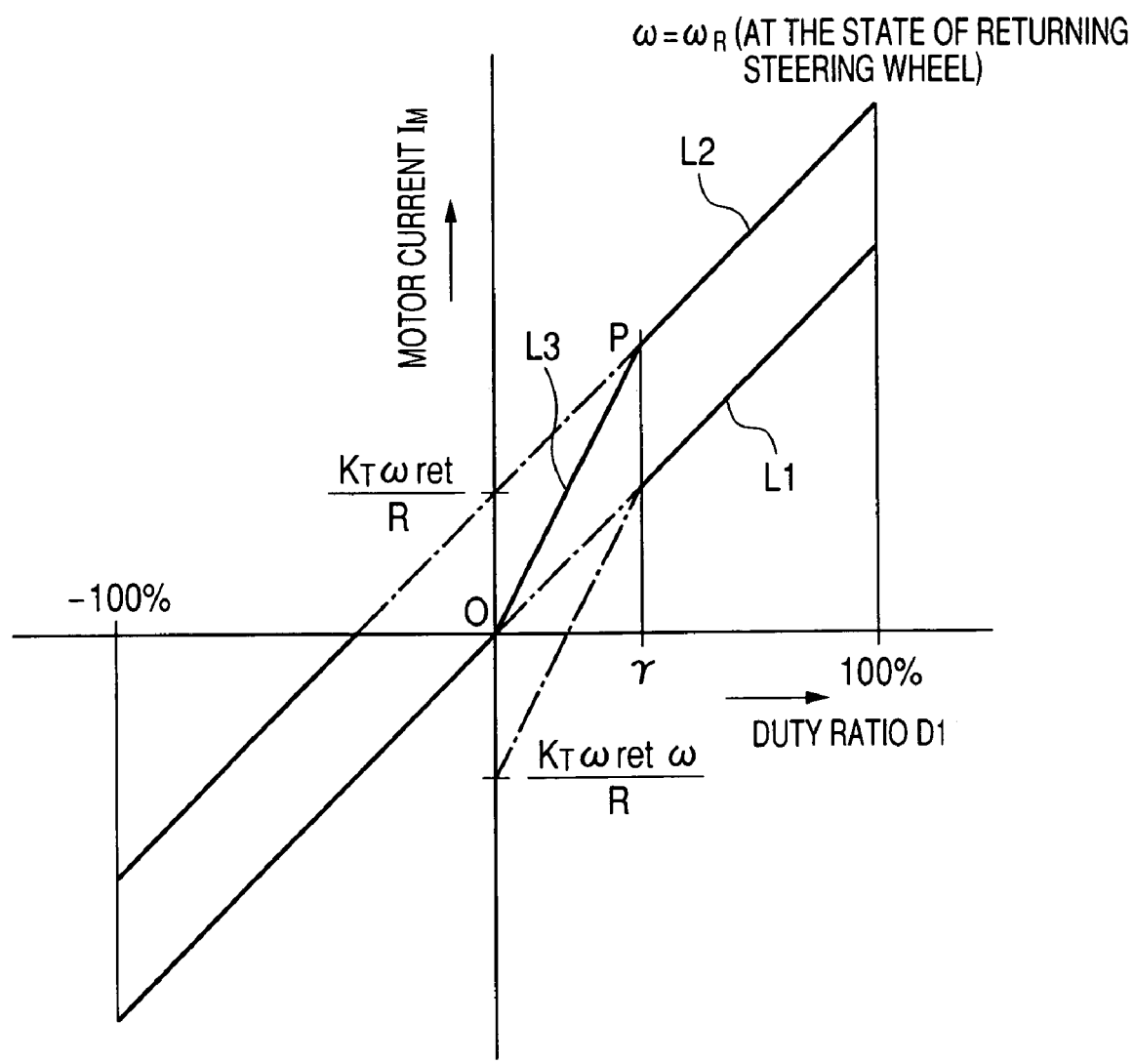
FIG. 8 is a characteristic line chart showing the relationship between a duty ratio and a motor current.

Then, the procedure moves to step S25 to decide whether or not the determined duty ratio D1 is at least a setting value γ. Here, the setting value γ is determined as described below. The steering torque is generated when the steering wheel is operated in a direction separate from a linear traveling position. When a steering wheel is returned to the linear traveling position from the steering state, the steering torque is "0", and the auxiliary steering command value $I_M^*$ calculated in the above-described control map shown in FIG. 5 is "0". However, since the counter electromotive force is generated in the electric motor 12 by a self-aligning torque, a relation between the duty ratio D1 and a motor current $I_M$ is represented by a straight line L1 passing an origin "0" under the steering state as shown in FIG. 8. When the steering wheel is returned, the relation between the duty ratio D1 and the motor current $I_M$ is represented by a straight line L2 shifted upward by the counter electromotive force generated in the electric motor 12 as shown in FIG. 8. Then, when the duty ratio D1 is "0", the straight line L1 when the steering wheel is operated is discontinuous from the straight line L2 when the steering wheel is returned.

In order to cancel this discontinuous state when the steering wheel is returned, as shown in FIG. 8, a straight line L3 passing the origin "0" needs to be set from the straight line L2. A value of the duty ratio D1 indicating an intersecting point of the straight line L3 and the straight line L2 is set as the setting value γ. Accordingly, when the duty ratio is at least the setting value γ, the procedure moves to step S26 and the duty ratio D2 is set to 100% before moving to step S28. When the duty ratio is lower than the setting value γ, the procedure moves to step S27, and as disclosed in Japanese Patent No. 3562040, a calculation of the below-described formula (3) is performed in accordance with the duty ratio D1 so as to follow the straight line L3. The duty ratio D2 of the pulse width modulation signals for driving the field effect transistors FET3 and FET4 of the lower-stage arm of the H bridge circuit 25 is calculated, and then the procedure moves to the step S28.

$$D2 = a \cdot D1 + b \quad (3)$$

Here, a and b are constants represented by below-described formulas.

$$a = -K_{T\omega R}/\gamma Vb$$

$$b = 1 + K_{T\omega R}/Vb$$

Here, $K_T$ designates a constant counter electromotive force of the motor, Vb designates a battery voltage, ωR designates an acceleration of the motor when the steering wheel is returned and γ designates the above-described setting value.

In the step S28, the battery voltage Vb is read, and then the procedure advances to step S29 to read the vehicle speed detecting value V. Then, the procedure moves to step S30 to decide whether or not the battery voltage Vb is lower than a previously set voltage decrease threshold value Vbs that indicates the decrease in a battery voltage. When Vb≧Vbs, it is decided that the battery voltage is normal and the procedure moves to step S31. In the step S31, the driving frequency of the pulse width modulation signals PWM1 to PWM4 respectively supplied to the gates of the field effect transistors FET1 to FET4 of the H bridge circuit 5 are set to a frequency FH exceeding an audible range (for instance, 20 kHz), and then the procedure moves to step S35. When Vb≦Vbs, it is decided that the decrease of the battery voltage is abnormal and the procedure moves to step S32. In the step S32, it is decided whether or not the vehicle speed detecting value V is lower than a setting vehicle speed Vs which is when an electric power consumed in the electric motor 12 is increased.

When the determination result of the step S32 is V≧Vs, it is decided that the electric power consumed in the electric motor 12 is low and little influence is applied to the battery voltage Vb, and the procedure advances to the step S31. When V>Vs, it is decided that the electric power consumed in the electric motor 12 is large and an influence applied to the battery voltage Vb is large, and the procedure advances to step S33 to set the duty ratio D2 to 100%. The field effect transistor FET3 or FET4 of the lower-stage arm of the H bridge circuit 25 is continuously turned on to eliminate a switching loss. Then, the procedure moves to step S34 to set the driving frequency of the pulse width modulation signals PWM1 to PWM4 that are respectively supplied to the gates of the field effect transistors FET1 to FET4 of the H bridge circuit 25 to a frequency FL within the audible range (for instance, 10 KHz), and then the procedure advances to step S35.

In the step S35, it is decided whether or not a sign of the motor current command value Ir is. When Ir≧0, the procedure advances to step S36 to output the pulse width modulation signal PWM1 of the duty ratio D1 to the gate of the field effect transistor FET1 of the upper-stage side that is the switching element on one diagonal line of the H bridge circuit 25, and to output the pulse width modulation signal PWM4 of the duty ratio D2 to the gate of the field effect transistor FET4 of the lower-stage side. Then, the PWM control process is completed to return to a prescribed main program.

On the other hand, when the determination result of the step S35 shows Ir<0, the procedure advances to step S37 to output the pulse width modulation signal PWM2 of the duty ratio D1 to the gate of the field effect transistor FET2 of the upper-stage side as the switching element on the other diagonal line of the H bridge circuit 25, and to output the pulse width modulation signal PWM3 of the duty ratio D2 to the gate of the field effect transistor FET3 of the lower-stage side. Then, the PWM control process is completed to return to the prescribed main program.

Now, an operation of the above-described embodiment will be described below.

When the ignition switch 18 is turned on, a power from the battery 17 is supplied to the controller 15 so that the auxiliary steering control process shown in FIG. 4 is carried out by the MCU21 in the controller 15 and the pulse width modulation control process shown in FIG. 7 begins to be performed by the FET gate driving circuit 26 in the motor driving circuit 23.

At this time, the battery voltage Vb of the battery 17 is assumed to be normal and is at least the voltage decrease threshold value Vbs.

Under this state, in the auxiliary steering control process shown in FIG. 4 that is performed by the MCU 21, the steering torque detecting value T detected in the steering torque sensor 3 is read (step S1). Then, the neutral torque To is subtracted from the read steering torque detecting value T to calculate the steering torque Ts (step S2). Then, the vehicle speed detecting value V is read from the vehicle speed sensor 16 (step S3). The auxiliary steering command value calculating map shown in FIG. 5 is referred to and the auxiliary steering command value $I_M^*$ (step S4) is calculated based on the steering torque Ts and the vehicle speed detecting value V.

Then, the auxiliary steering command value $I_M^*$ is differentiated to calculate a differentiated value Id for controlling a differentiated compensation in a feed-forward control (step S5). Then, the motor current detecting value $I_{MD}$ is read from the motor current detecting circuit 22 (step S6). Then, the motor current detecting value $I_{MD}$ is subtracted from the auxiliary steering command value $I_M^*$ to calculate a current deviation ΔI (step S7). The calculated current deviation ΔI is proportionally calculated to calculate a proportional value ΔIp for controlling a proportional compensation (step S8). The current deviation ΔI is also integrated to calculate an integrated value ΔIi for controlling an integrated compensation (step S9). Then, the differentiated value Id, the proportional value ΔIp and the integrated value ΔIi are added together to calculate the motor current command value Ir (step S10), and then the calculated motor current command value Ir is outputted to the motor driving circuit 23.

In the motor driving circuit 23, since the motor current command value Ir is inputted to the FET gate driving circuit 26, the pulse width modulation control process shown in FIG. 7 is performed in the FET gate driving circuit 26.

In this pulse width modulation control process, the motor current command value Ir is read and the motor current detecting value $I_{MD}$ is read (steps S21, S22). Then, the voltage $V_M$ between terminals of the motor is calculated in accordance with the above-described formula (2) and a motor angular velocity ω is calculated in accordance with the above-described formula (1) on the basis of the voltage $V_M$ between terminals of the motor (step S23)

As described above, the voltage $V_M$ between terminals of the motor is calculated on the basis of the previous duty ratios D1 and D2 and the battery voltage Vb in accordance with the formula (2). Thus, a detector for a voltage between terminals of the motor does not need to be provided, and the number of parts can be reduced to decrease an entire production cost.

Then, the duty ratio D1 corresponding to the read motor current command value Ir is calculated (step S24). Then, it is determined whether or not the calculated duty ratio D1 is at least a setting value γ (step S25). When the duty ratio D1≧γ, the duty ratio D2 is set to 100% (step S26). When the duty ratio D1 is lower than the setting value γ, the above-described formula (3) is computed on the basis of the calculated duty ratio D1 to calculate the duty ratio D2.

Then, since the battery voltage Vb is normal and Vb≧Vbs, the driving frequency of the pulse width modulation signals PWM1 to PWM4 supplied to the H bridge circuit 25 is set to a frequency FH exceeding an audible range (for instance, 20 kHz). Then, either the pair of FET1 and FET 4 or the pair of FET 2 and FET3 of the H bridge circuit 25 is selected in accordance with the sign of the motor current command value Ir. The pulse width modulation signal PWM1 (or the PWM2) of the duty ratio D1 is supplied to the FET1 (or the FET2) of the selected pair and the pulse width modulation signal PWM4 (or the PWM3) of the duty ratio D2 is supplied to the FET4 or (the FET3). Thus, a normal driving current (or a reverse driving current) is supplied to the electric motor 12 to generate the auxiliary steering force corresponding to the steering torque exerted on the steering wheel 1. The auxiliary steering force is transmitted to the output shaft 2b through the speed reducing gear 11.

At this time, when a wheel turning operation is carried out under a stopping state, the steering wheel 1 is steered, since the gradient of the characteristic line chart of the auxiliary steering command value calculating map shown in FIG. 5 is large, a large auxiliary steering command value $I_M^*$ is calculated by a small steering torque Ts. Thus, the large auxiliary steering force can be generated in the electric motor 12 to realize a light steering operation.

On the other hand, when the vehicle starts so that a vehicle speed reaches a prescribed vehicle speed or higher, the gradient of the characteristic line of the auxiliary steering command value calculating map shown in FIG. 5 becomes small. Accordingly, a small auxiliary steering command value $I_M^*$ is calculated even with a large steering torque Ts. Thus, the auxiliary steering force generated in the electric motor 12 is decreased to restrain the steering wheel 1 from being steered too lightly so that an optimum steering operation can be realized.

Figure 9:
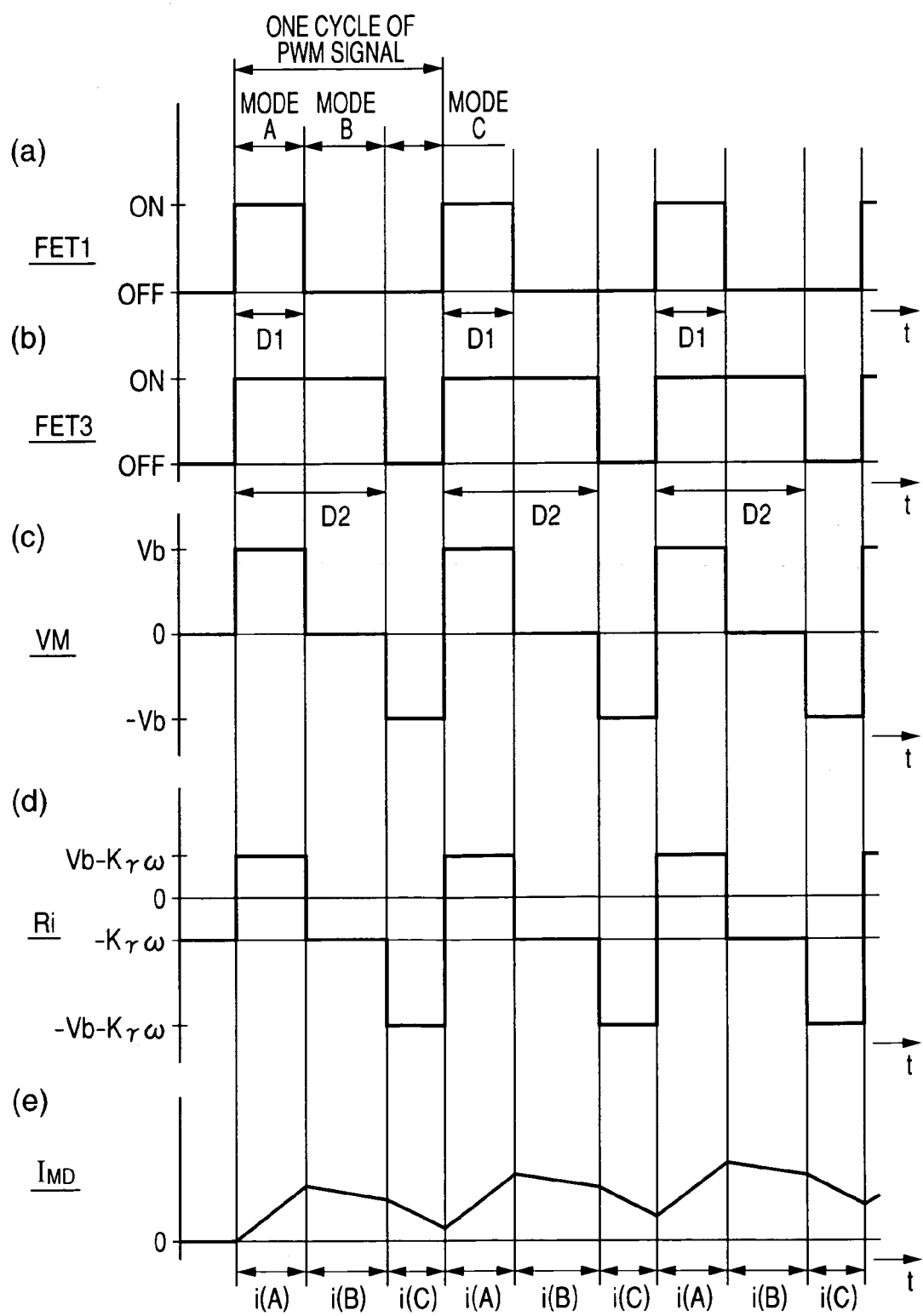
FIG. 9 is a signal wave form diagram for explaining an operation of the present invention.

As shown in FIGS. 9(a) and 9(b), for instance, in the pulse width modulation signals PWM 1 and PWM 4 supplied to the field effect transistors FET1 and FET4 on one diagonal line of the H bridge circuit 25, when the pulse width modulation signal PWM1 has the duty ratio D1 that is smaller than the setting value γ and the pulse width modulation signal PWM4 has the duty ratio D2 that is smaller than 100%, a mode A in which the pulse width modulation signals PWM1 and PWM4 are both turned on during one cycle, a mode B in which the pulse width modulation signal PWM1 is turned off and the pulse width modulation signal PWM4 is turned on, and a mode C in which both the pulse width modulation signals PWM1 and PWM4 are turned off arise.

Figure 10A:
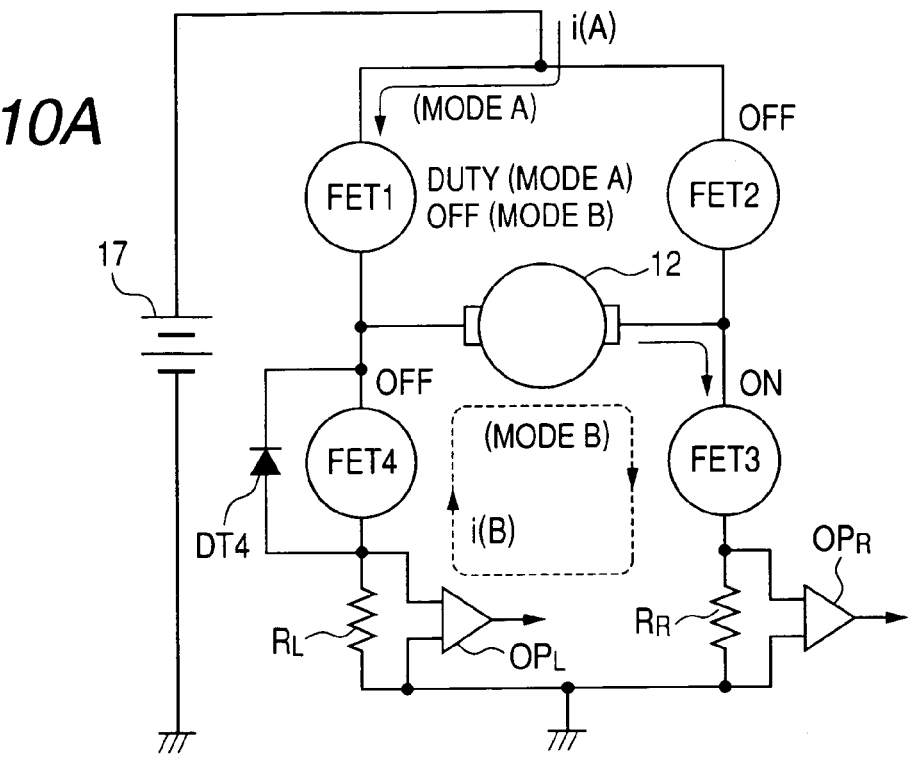
FIGS. 10A and 10B are explanatory views for explaining a current mode of an H bridge circuit.

In the mode A, since both the field effect transistors FET1 and FET4 are turned on, the voltage $V_M$ between terminals of the electric motor 12 becomes the battery voltage Vb, as shown in FIG. 9(c). Under this state, the motor current flows in order from the battery 17 to the field effect transistor FET1, to the electric motor 12, to the field effect transistor FET4, and to the resistance $R_R$ as shown by an arrow mark of the solid line in FIG. 10(a). A voltage effect at both the ends of the resistance $R_R$ is detected by the operational amplifier $OP_R$ so as to detect a motor current i (A)

Further, in the mode B, since the field effect transistor FET1 is turned off and the field effect transistor FET4 is turned on, the voltage $V_M$ between the terminals of the electric motor 12 is zero as shown in FIG. 9(c). Therefore, magnetic energy stored in the electric motor 12 is converted to electric energy and the current flows in order from the electric motor 12, to the field effect transistor FET3, to the resistance $R_R$, to the resistance $R_L$, to a regenerative diode DT4 of the field effect transistor FET 4, and to the electric motor 12 as shown by a dashed line in FIG. 10(a). The voltage effect at both ends of the resistance $R_R$ is detected by the operational amplifier $OP_R$ so as to detect a motor current i(B). At this time, the operational amplifier $OP_L$ for detecting the voltage effect at both ends of the resistance of the $R_L$ has a unipolar power source (one side power source) so that it cannot detect a current flowing in an opposite direction. Thus, the detected current value of the operational amplifier $OP_L$ is "0".

Figure 10B:
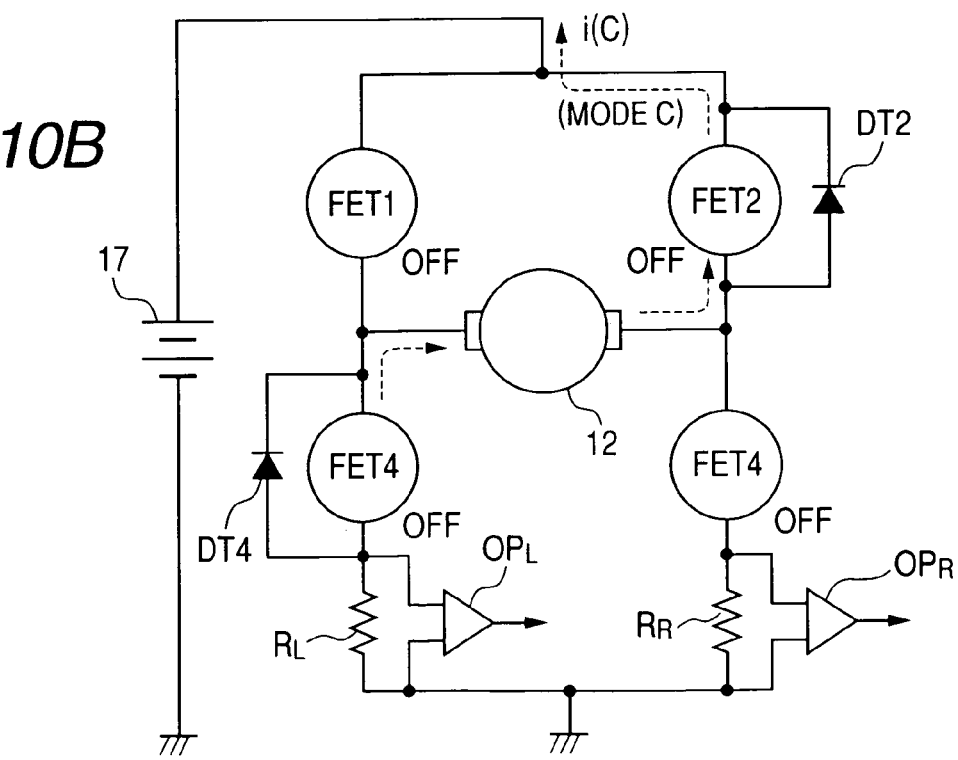

Further, in the mode C, since both the field effect transistors FET1 and FET4 are turned off, as shown in FIG. 10(b), a current circuit is formed from the resistance $R_L$ via a regenerative diode DT4 of the field effect transistor FET4, the electric motor 12 and a regenerative diode DT2 of the field effect transistor FET2 to the battery 17. The voltage $V_M$ between the terminals of the electric motor 12 is a negative battery voltage –Vb. At this time, the magnetic energy stored in the electric motor 12 is converted to the electric energy. Accordingly, the current i(C) flows in the direction contrary to the voltage –Vb between the terminals of the electric motor 12. However, the operational amplifier $OP_L$ for detecting the voltage effect at both the ends of the resistance $R_L$ has the unipolar power source (one side power source), so that it cannot detect the current flowing in an opposite direction. Thus, the detected current value of the operational amplifier $OP_L$ is "0".

Therefore, during the one cycle of the pulse width modulation signals PWM 1 and PWM4, the motor current $I_M$ actually supplied to the electric motor 12 respectively in the stages of the mode A, the mode B and the mode C can be expressed by a below-described formula (4).

$$I_M = i(A) + i(B) + i(C) \quad (4)$$

On the other hand, since the current i(C) is not detected, the sum total of the motor current detecting value $I_{MD}$ detected in the current detecting circuit 22 is expressed by a below-described formula (5).

$$I_{MD} = i(A) + i(B) \quad (5)$$

A period in which the motor current $I_{MD}$ is detected during the one cycle of the pulse width modulation signal corresponds to the periods of the mode A and the mode B during the one cycle of the pulse width modulation signal. This corresponds to the duty ratio D2 (see FIG. 9). Thus, the motor current $I_{MD}$ can be expressed by a below-described formula (6).

$$I_{MD} = D2 \cdot I_M \quad (6).$$

Accordingly, the motor current $I_M$ actually supplied to the electric motor 12 can be expressed by a below-described formula (7) by modifying the above-described formula (6).

$$I_M = I_{MD}/D2 \quad (7)$$

FIG. 9(e) shows an example illustrating the state of change of the motor current $I_M$ in each stage of mode A, mode B and mode C respectively. The state gradually approaches a balanced state with the elapse of time.

When the battery 17 is normal in this way, the formula (2) is calculated on the basis of the duty ratio D1 determined in accordance with the motor current command value Ir to calculate the duty ratio D2. Since the pulse width modulation signal of the duty ratio D2 is supplied to the gates of the field effect transistors FET3 and FET4 forming the lower-stage arm of the H bridge 25, even when the steering torque is not generated at the state of returning the steering wheel, a discontinuous part does not arise between the motor current and the duty ratio in a part where the duty ratio is near zero. Accordingly, an oscillating current is not generated, noise is not generated, and the stability of a feed-back control is not prevented.

Figure 11:
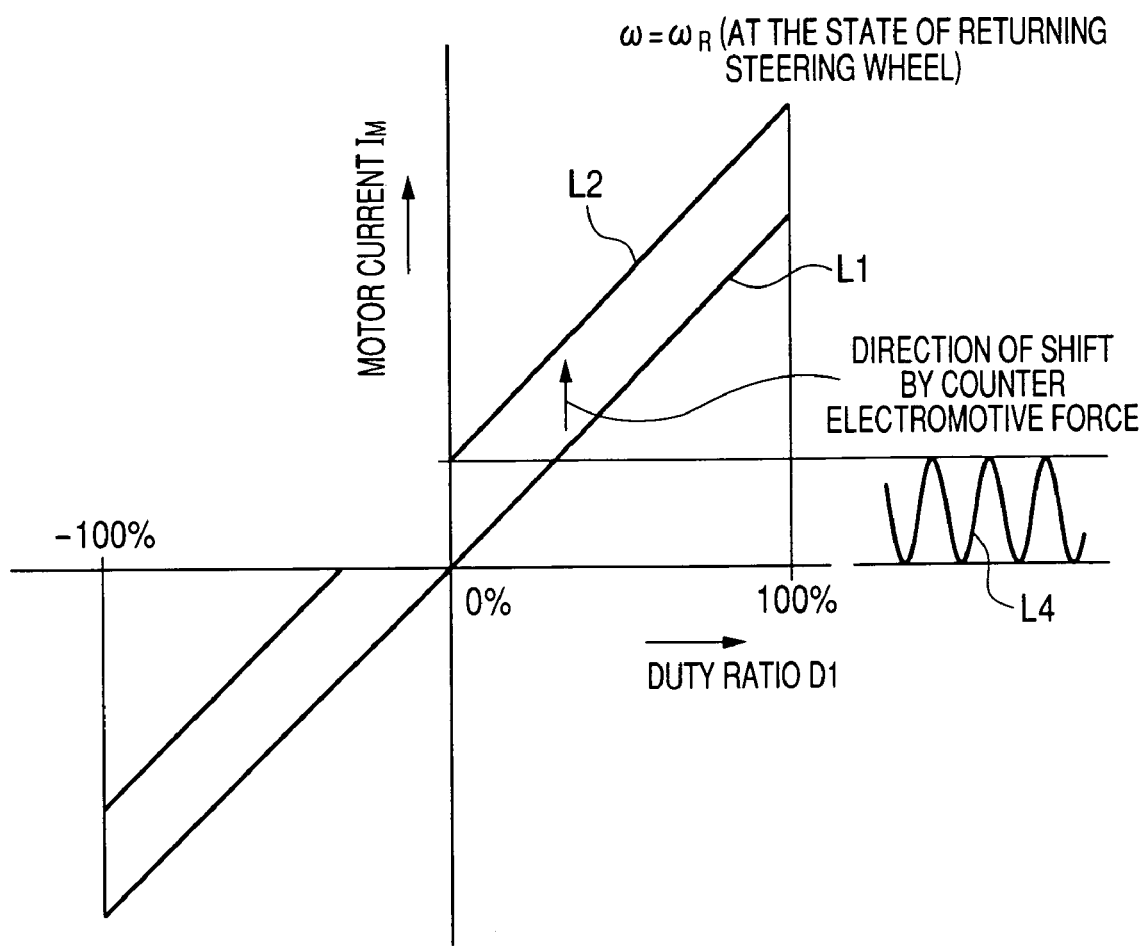
FIG. 11 is a characteristic line chart showing the relationship between the duty ratio and the motor current in which a discontinuous state exists.

That is as described above, in the relation between the duty ratio D and the motor current $I_M$, when the motor current shifts upward by a part corresponding to the counter electromotive force generated in the electric motor 12 when the steering wheel is returned, a discontinuous part arises in the vicinity of where the duty ratio is "0". On the other hand, in a feed-back control part (the steps S6 to S10 in FIG. 4), the motor current command value Ir is to be calculated. However, since there is no duty ratio D corresponding to the auxiliary steering command value $I_M^*$, the oscillating current having an amplitude corresponding to the discontinuous part of the motor current $I_M$ is outputted as the motor current command value Ir as shown by a line L4 in FIG. 11. The generation of the oscillating current undesirably prevents the stability of the feed-back control which causes noise to be generated. In this embodiment as shown in FIG. 8, the duty ratio D1 is prevented from being discontinuous from the motor current $I_M$ because of the straight line L3 in the vicinity of the duty ratio D1 of "0". Accordingly, the generation of the oscillating current can be assuredly prevented.

On the other hand, when the battery voltage abnormality arises wherein the battery voltage Vb is lower than the voltage decrease threshold value Vbs, by the pulse width modulation control process shown in FIG. 7 performed by the FET gate driving circuit 26 of the motor driving circuit 23, the step S30 moves to the step S32. When the vehicle speed detecting value V is at least the setting vehicle speed Vs, as a surface resistance is reduced the steering torque T when the steering wheel is steered is reduced. Further, the inclination of the characteristic line in the auxiliary steering command value calculating map shown in FIG. 5 is decreased. Accordingly, the auxiliary steering command value $I_M^*$ also becomes a small value and the current supplied to the electric motor 12 decreases. Thus, the voltage $V_M$ between the terminals of the motor can be ensured to continuously perform the auxiliary steering control. In this case, since the duty ratio D2 can be calculated in accordance with the formula (2), even when the steering torque is not generated when the steering wheel is returned, the discontinuous part disappears between the motor current and the duty ratio in the part in the vicinity of where the duty ratio is 0. Consequently, the oscillating current is not generated, noise is not generated, and the stability of the feed-back control is not blocked.

However, when the battery voltage Vb is lower than the voltage decrease threshold value Vbs and the vehicle speed detecting value V is lower than the setting vehicle speed Vs, the steering torque Ts itself becomes a large value and the inclination of the characteristic curve of the auxiliary steering command value calculating map is increased. Thus, a quantity of electric power consumed in the electric motor 12 is increased. This has a great influence on the decrease in the battery voltage Vb.

Under this state, in the pulse width modulation control process performed in the FET gate driving circuit 26, the step S32 moves to the step S33 to set the duty ratio to 100%. The field effect transistor FET3 or FET4 forming the lower-stage arm of the H bridge circuit 25 stops a switching operation and is set to continuously remain on. Accordingly, the switching loss of the field effect transistor FET3 or FET4 forming the lower-stage arm becomes zero.

The step S33 moves to the step S34 to lower the driving frequency of the pulse width modulation signals PWM1 to PWM4 to a frequency FL within the audible range (for instance, 10 kHz), so that the switching loss of the field effect transistor FET1 or FET2 forming the upper-stage arm of the H bridge circuit 25 can be reduced.

Namely, the on resistance loss $P_{RON}$ due to the on resistance of the field effect transistor is added to the switching loss $P_{SW}$ due to the switching operation of the field effect transistor to become the loss $P_{FET}$ (=$P_{RON}$+$P_{SW}$) of the field effect transistor. The on resistance loss $P_{RON}$ can be expressed by the below-described formula (8). The switching loss $P_{SW}$ can be expressed by the below-described formula (9).

$$P_{RON}=I_M^2 \times R_{ON} \times D \quad (8)$$

Here, $R_{ON}$ represents the on resistance of the field effect resistance and D represents the duty ratio of the pulse width modulation signal.

$$P_{SW} = \frac{1}{T}\int_0^{t_{ON}} P\,dt + \frac{1}{T}\int_0^{t_{OFF}} P\,dt \quad (9)$$
$$= \frac{1}{6} V_{DS} \cdot I_M (t_{ON} + t_{OFF}) f$$

Here, $V_{DS}$ represents voltage between a drain and a source of the field effect transistor. tON represents a turn-on time of the field effect transistor. tOFF represents a turn-off time of the field effect transistor. f represents a frequency of the pulse width modulation signal.

Accordingly, as described above, the field effect transistor FET3 or FET4 of the lower-stage arm of the H bridge circuit 25 is changed from an operating state by the pulse width modulation signal to the continuous on state so that the switching loss $P_{SW}$ of the field effect transistor FET3 or FET4 can be reduced to zero. Further, the driving frequency of the pulse width modulation signals PWM1 to PWM4 is lowered from the frequency FH exceeding the audible range to the frequency FL within the audible range. Thus, the frequency f in the above-described formula (10) for the field effect transistor FET1 or FET2 of the upper-stage arm of the H bridge circuit 25 in which the pulse width modulation control is continuously performed can be reduced so as to markedly lower the switching loss $P_{SW}$.

Therefore, when the battery voltage Vb is lower than the voltage decrease threshold value Vbs, the switching loss $P_{SW}$ of the field effect transistors FET1 to FET4 is reduced so that the voltage between the terminals of the motor can be ensured even though the relation between the duty ratio D1 and the motor current $I_M$ is discontinuous. However, a range of the battery voltage in which the auxiliary steering control can be continuously carried out can be enlarged.

In the above-described embodiment, when the battery voltage Vb is lower than the voltage decrease threshold value Vbs, and the vehicle speed detecting value V is lower than the setting vehicle speed Vs, the duty ratio D2 of the pulse width modulation signals PWM 3 and PWM 4 supplied to the field effect transistors FET3 or FET4 forming the lower-stage arm of the H bridge circuit 25 is set to 100%. The driving frequency of the pulse width modulation signals PWM1 to PWM4 is lowered from the frequency FH exceeding the audible range to the frequency FL within the audible range. However, the present invention is not limited thereto. When the battery voltage Vb is lower than the voltage decrease threshold value Vbs and a condition that the vehicle speed detecting value V is lower than the setting vehicle speed Vs is removed, all the duty ratio D2 may be set to 100% and the driving frequency of the pulse width modulation signals PWM1 to PWM4 may be lowered to the frequency FL within the audible range.

Further, in the above-described embodiment, the auxiliary steering control is performed by using the MCU 21. However, the present invention is not limited thereto and other processing units may be employed. Additionally, hardware using a processing circuit, an addition circuit, a comparison circuit or the like may be formed.

Further, in the explanation of the above-described embodiment, the auxiliary steering control is performed in the MCU 21 and the pulse width control process is performed in the FET gate driving circuit 26. However, the present invention is not limited thereto. Both the auxiliary steering control process and the pulse width control process may be performed in the MCU 21. The MCU 21 may directly drive control the H bridge circuit 25.

FIG. 4
S1 Read torque detecting value T.
S3 Read vehicle speed detecting value V.
S4 Refer to a control map to calculate auxiliary steering command value $I_M^*$.
S5 Calculate differentiated value Id for an auxiliary steering compensation value $I_M^{*'}$.
S6 read motor current detecting value $I_{MD}$.
S7 calculate current deviation ΔI. ΔI=$I_M^{*'''}$=−$I_{MA}$ S8 Calculate proportional value ΔIp of current deviation ΔI.
S9 Calculate integrated value ΔIi of current deviation ΔI.
S10 Calculate motor current command value Ir. Ir=Id+ΔIp+ΔIi
S11 Output motor current command value Ir to a motor driving circuit.

FIG. 7
S21 Read motor current command value Ir . . .
S22 Read motor current detecting value $I_{MD}$.
S23 Calculate motor angular velocity ω.
S24 Calculate duty ratio D1 corresponding to motor current command value Ir.
S25 D≧γ?
S27 Calculate duty ratio D2 on the basis of duty ratio D1. D2=a·D1+b
S28 Read battery voltage Vb.
S29 Read vehicle speed detecting value V.
S30 Vb<Vbs?
S31 PWM driving frequency=$F_1$Hz
S32 V<Vs?
S34 PWM driving frequency=$F_2$Hz
S35 Output pulse width modulation signals PWM1 to PWM4 to FET1 to FET4 in accordance with the sign of current command value Ir.

What is claimed is:

1. An electric power steering device comprising:
   two series circuits, comprising switching elements of an upper stage and a lower stage, respectively;
   an H bridge circuit comprising the two series circuits which are connected in parallel with each other;
   an electric motor for giving an auxiliary steering force to a steering system;
   a control part for controlling the switching elements on a diagonal line in the upper stage and a diagonal line in the lower stage of the H bridge circuit to be respectively pulse-width modulated by a plurality of differing duty ratios in accordance with a steering torque exerted on the steering system; and
   an electric power supply source for supplying an electric power to the H bridge circuit;
   wherein the electric motor is provided between intermediate portions of the two series circuits, the intermediate portions being located between the switching element of the upper stage and the switching element of the lower stage,
   wherein at a state that when the voltage of the electric power supply source is at least a prescribed voltage, the control part controls the switching elements on the diagonal lines to be pulse-width modulated by the different duty ratios with a frequency exceeding an audible range, and
   wherein at an abnormal time when the voltage of the electric power supply source is less than the prescribed voltage, the control part controls the switching elements in the upper stage of the switching elements on the diagonal lines to be pulse-width modulated with a frequency within the audible range, and the switching elements in the lower stage are controlled to be turned on.

2. The electric power steering device according to claim 1, further comprising:
   a vehicle speed detecting unit for detecting a vehicle speed,
   wherein when the voltage of the electric power supply source is less than the prescribed voltage and the vehicle speed detected by the vehicle speed detecting unit is at least a prescribed vehicle speed, the control part controls the switching elements in the upper stage on the diagonal lines to be pulse-width modulated with the frequency within the audible range, and the switching elements in the lower stage are controlled to be turned on.

* * * * *